(12) United States Patent
Moore

(10) Patent No.: US 6,221,133 B1
(45) Date of Patent: Apr. 24, 2001

(54) FLUID SEPARATION PACKING

(75) Inventor: Frank D. Moore, Tallmadge, OH (US)

(73) Assignee: Norton Chemical Process Products Corporation, Worcester, MA (US)

( * ) Notice: Subject to any disclaimer, the term of this patent is extended or adjusted under 35 U.S.C. 154(b) by 0 days.

(21) Appl. No.: 09/474,484

(22) Filed: Dec. 29, 1999

(51) Int. Cl.[7] .................................................. B01D 3/22
(52) U.S. Cl. ................. 95/199; 95/211; 95/219; 95/221; 95/223; 261/79.2; 261/114.3
(58) Field of Search ............................. 95/199, 211, 219, 95/221, 223; 261/79.2, 114.3, DIG. 72; 96/290

(56) References Cited

U.S. PATENT DOCUMENTS

| | | | |
|---|---|---|---|
| 3,028,151 | * | 4/1962 | Kittel ................................. 261/114.3 |
| 3,045,989 | * | 7/1962 | Kittel ................................. 261/114.3 |
| 3,817,501 | * | 6/1974 | Tjutjunnikov et al. ............ 261/114.3 |
| 4,036,917 | * | 7/1977 | Slobodyanik ...................... 261/114.3 |
| 4,755,198 | * | 7/1988 | Parton ................................. 261/79.2 |
| 5,098,615 | * | 3/1992 | Resetarits .......................... 261/114.3 |
| 5,637,263 | * | 6/1997 | Lang et al. ..................... 261/DIG. 72 |
| 5,660,616 | * | 8/1997 | Choi et al. ........................ 261/114.3 |
| 5,683,493 | | 11/1997 | Stober . |
| 5,772,870 | * | 6/1998 | Basse ............................. 261/DIG. 72 |
| 5,972,171 | * | 10/1999 | Ross et al. ............................... 95/219 |

* cited by examiner

*Primary Examiner*—Duane Smith
*Assistant Examiner*—Minh-Chau T. Pham
(74) *Attorney, Agent, or Firm*—David Bennett

(57) ABSTRACT

The invention provides a cellular packing including a vapor/liquid separation device that can be stacked vertically with minimum wasted space. The packing uses static vanes in each cell to direct the liquid component of a vapor/liquid mixture to exit slots in a first cell and a recirculation path for the liquid to be contacted with vapor again in a second cell located below the first.

4 Claims, 3 Drawing Sheets

FLUID SEPARATION PACKING

BACKGROUND OF THE INVENTION

This invention relates to packing elements for use in chemical process equipment. It relates specifically to packing elements of a novel and advantageous design that are particularly useful in separating vapors from entrained liquids while permitting counterflow contact to maximize mass transfer between the vapor and the liquid.

In distillation or fractionation towers in which a liquid and a vapor are contacted in a countercurrent flow to effect mass transfer, the vapor and liquid to some extent travel co-currently as a result of entrainment of the liquid in the vapor. There is a need to separate these components at the end of the passage through the tower to maintain efficient operation. The vapor entrains significant amounts of liquid during its passage, particularly if the vapor moves with a relatively high velocity. Separation of the entrained liquid is very desirable to complete the process and therefore various devices have been designed to accomplish this end.

While effective separation can be achieved by slowing the rate of flow, this is often impractical for reasons of space or efficiency of recycling. It is therefore highly desirable that the separation process be achieved "in-line".

A particularly effective device is described in U.S. Pat. No. 5,683,493 which provides a plurality of packing elements or cells in vertically stacked layers. In each cell an upflowing vapor/liquid mixture enters through slits in the bottom and exits at the top into a cell in the layer above through slits in the bottom of that cell. Thus vapor/liquid mixture enters through slits in the bottom of a first cell and is caused to take on a rotational motion as it rises within the cell. This causes the liquid component to be expelled through slits in the outer wall of the cell into a downcomer connected to second similar cell offset below the first cell in which it meets an upflowing vapor/liquid mixture. Meanwhile the upflowing vapor from the first cell enters through slits in the bottom of a third cell located above the first cell. By having cells in adjacent layers off-set, the flows are caused to mix thus minimizing localized variations. This arrangement however carries with it certain space penalties that are preferably avoided. The present invention provides a packing system with liquid/vapor separation capabilities that comprises a series of identical cells stacked one on top of another which provide a highly compact and yet efficient structure for achieving the separation.

GENERAL DESCRIPTION OF THE INVENTION

The present invention provided a packing with vapor/liquid separation capabilities which comprises a cylindrical cell with a vertical axis having lower and upper portions and a chimney portion within the cylindrical cell wherein:

a) the lower portion has an annular base area with slots of a size to permit access of upflowing vapors when in use, surrounding an axially central cylinder of smaller cross-section which is open at the lower end and closed at the upper end and which communicates through radial slots adjacent the closed upper end with hollow static radial vanes which are angled with respect to the vertical and extend from the axially central cylinder and through the wall of the cylindrical cell into an annular jacket zone surrounding the cylindrical cell at a point adjacent the lower end of said jacket zone, said jacket zone being defined by the wall of the cylindrical cell and an outer co-axial jacket wall;

b) the upper portion is open and terminates at a point lower than the outer wall of the outer co-axial jacket zone and is provided with slots in the wall of the cylindrical cell; and c) the chimney portion is coaxial with the cylindrical cell, has essentially the same length, has a diameter greater than the axially central cylinder and is provided with perforations adjacent to the lower end of the chimney portion allowing communication between the interior of the central chimney portion and the annular base area of the cylindrical cell.

The various components of the cell are described as being cylindrical but it should be understood that the term "cylindrical" is not limited to right cylinders but is intended to embrace cylinders with cross-sections that are polygonal or oval also. Generally however where the packing comprises a single stack of such cells, it is preferred that the jacket zone, the cylindrical cell, the central chimney portion and the axially central cylinder are co-axial and have cross-sections of the same shape but of course different dimensions.

In use a plurality of such cells are stacked vertically such that a vapor/liquid mixture enters through the slots in the base of a first cylindrical cell and comes into contact with the hollow angled static radial vanes which impart a radial motion to the flow as it rises within the cell. The heavier liquid is directed towards the wall of the cell and passes through the slots in the upper portion of the wall of the cell into the jacket zone. From the jacket zone the liquid exits through the hollow angled static radial vanes from which it flows into the axially central cylinder.

A second cell located below the first cell fits such that the upper end of the outer wall of the jacket zone of the second cell is in contact with the lower end of the outer wall of the jacket of the first cell.

Liquid flowing out through the passages in the axially central cylinder of the first cell enters the chimney portion of the second cell from which it flows through passages in the lower part of the chimney portion and over the slots in the base of the second cell through which vapor is rising.

Meanwhile vapor passing up through the first cell passes through slots in the base of a third cell located above the first cell.

The hollow static radial vanes can have any shape that achieves the directing effect such as rectangular or curved. Preferably however they have an aerofoil cross-section with a convex upper surface such that a vapor/liquid mixture passing over the vanes forms vortices that enhance the imparted radial motion promoting ejection of the liquid through the slots in the cell wall. The vanes also preferably have a direction that is also angled with respect to the radial direction established by the axis and the end of the vane closest to the axis so as to enhance the generation of a swirling motion within the cell.

DESCRIPTION OF PREFERRED EMBODIMENTS

Figure 1:
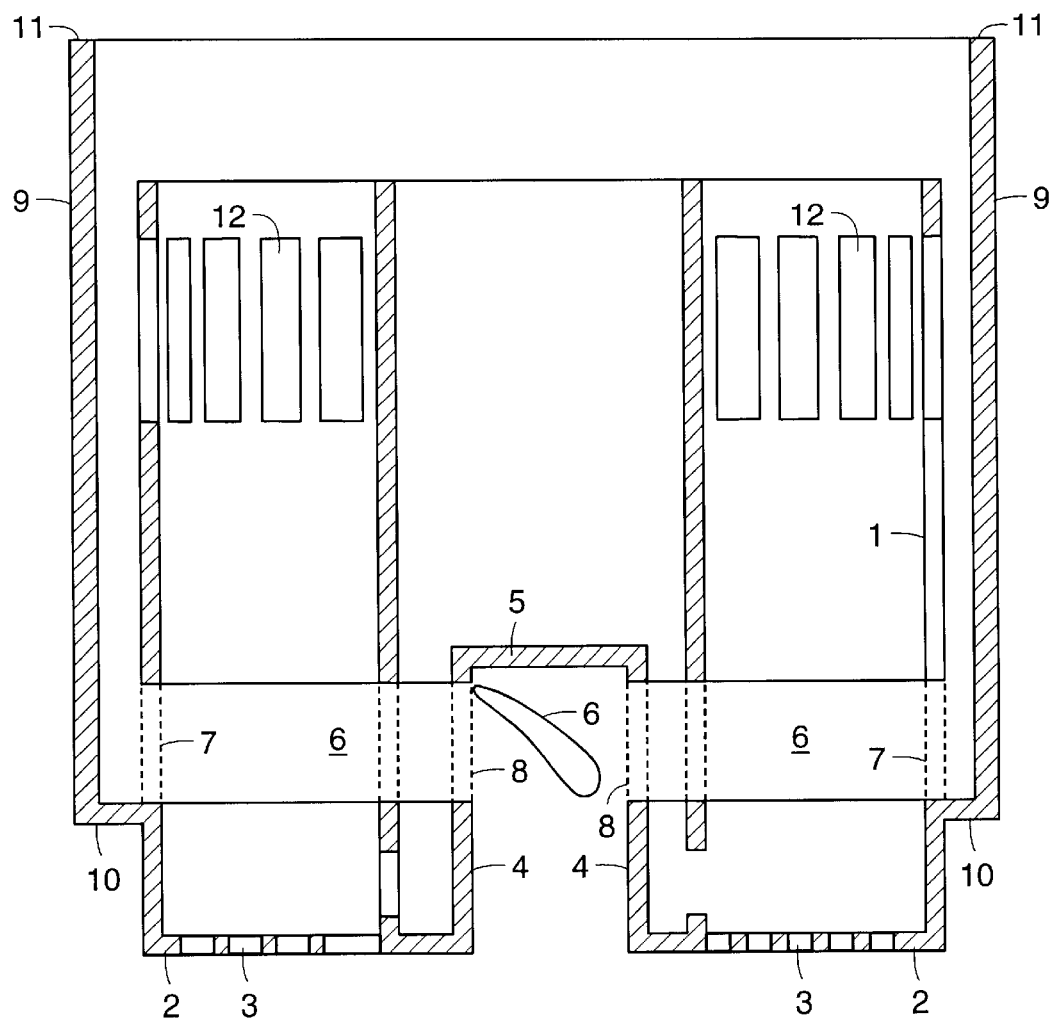
FIG. 1 is a cross-section of a cell according to the invention.
Figure 2:
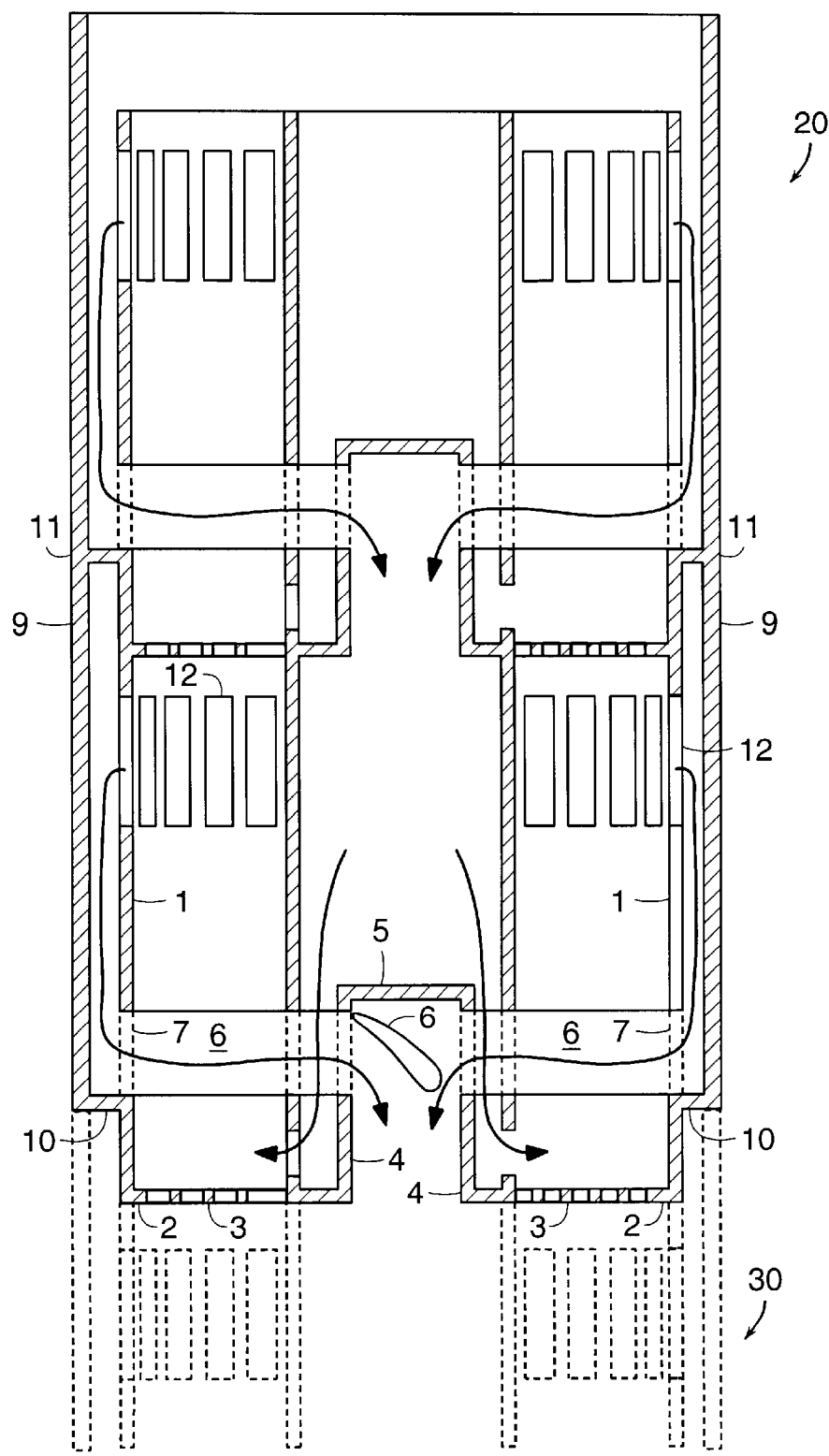
FIG. 2 is a-cross-section of a stack of cells to show the cooperation of the cells in separating liquid and vapor.

The invention is further described with particular reference to the Drawings which are understood to show one preferred embodiment and not to imply essential limitations on the scope of the invention. In FIGS. 1 and 2, a first cell has a cylindrical wall, 1, and a base comprising a outer zone, 2, having a plurality of perforations, 3; and an axially located cylinder, 4, projecting within the cell and having a closed upper end, 5. Hollow static vanes, 6, angled so as direct vapor flowing vertically upwards into contact with the vanes towards the cell walls, project through apertures in both the cell wall and the axially located cylinder, 7 and 8 respectively. A jacket, 9, co-axial with the cell is fitted around the cell with the bottom of the jacket, 10, located just below, 7, and the top, 11, projecting above the open end of the cell. The upper end of the cell is provided with slits, 12, in the cell wall communicating with the jacket zone defined by the space between the outside of the cell wall and the jacket.

FIG. 2 shows a first cell as illustrated in FIG. 1 and a second cell, 20, located above and nested with the first cell. A third cell, 30, partially shown in ghost lines is located below and nested with the first cell.

Flow arrows indicate the path of liquid exiting each cell through the slits, 12, in the upper portion of the cell, into the jacket, 9, and thence through the hollow vanes, 6, into the axially located cylinder, 4, within the cell which acts as a downcomer for the cell immediately below. Vapor flows up through the passages, 3, in the bottom 2 of the cell, over the angled hollow vanes, 6, where liquid is separated and then through the passages in the bottom of the cell located immediately above.

Figure 3A:
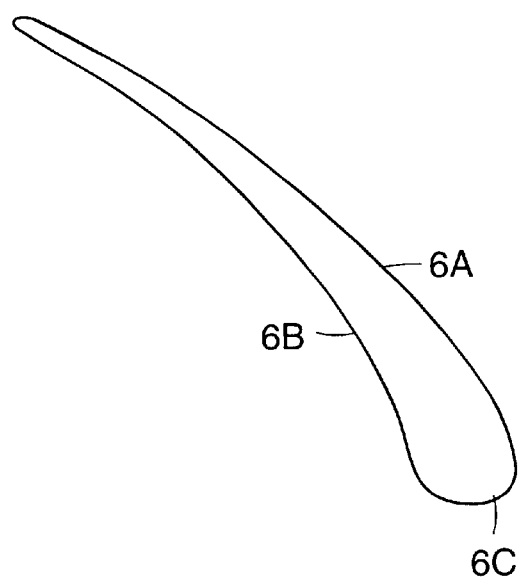
FIG. 3a is a cross-section of a preferred radial angled vane used in the cells and FIG. 3b shows the vanes from above and angled with respect to the radius of the cell so as to generate a swirling motion within the cell.
Figure 3B:
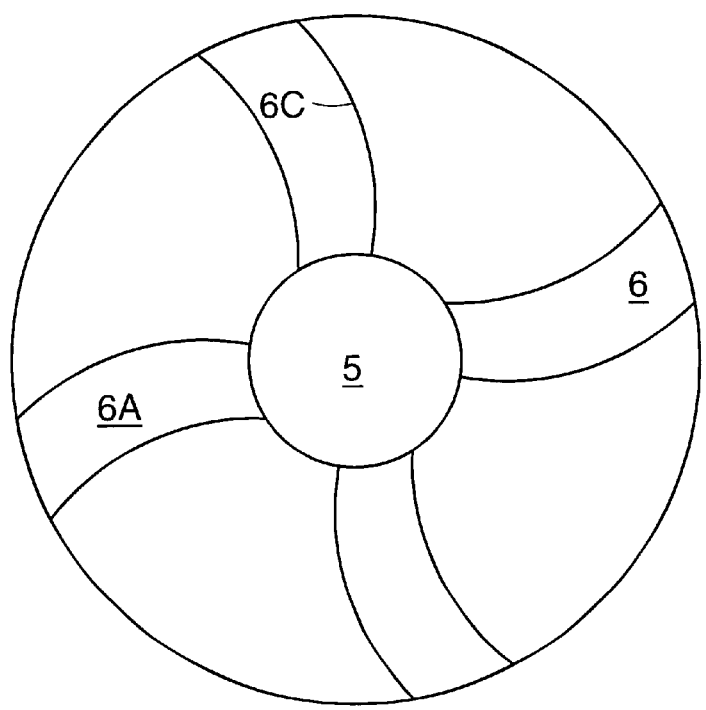

The preferred cross-section of the vanes, 6, is shown in FIG. 3a, which is an isolated view of the cross-section that appears in FIGS. 1 and 2. The vanes have upper and lower surfaces, 6A and 6B respectively, and are angled such that the rising vapor contacts a leading edge, 6C, which causes a vortex to develop as the vapor/liquid mixture passes over the lower surface. This further enhances the separation of liquid from the vapor. The vanes are also preferably angled with respect to the radial direction such that they impart a further swirling motion as the vapor stream passes up the cell. FIG. 3b shows this angling in an isolated view of the vanes from above with the chimney portion of the cell and the-jacket zone removed for greater clarity. The Figure shows four vanes but obviously the number can be three, four or any larger number consistent with the intention of creating the swirling motion but not impeding the flow significantly such that an unacceptable pressure drop across the cell is created.

The number of cells in a stack is limited only by the space available and the degree of separation required. The cells in the Drawings are shown as having a circular cross-section but where it is desired to have a plurality of similar cells in a layer, right cylindrical cells would leave wasteful spaces between contiguous cells. In such circumstances it is more useful to have polygonal cells with cross-sections such as hexagons that nest together readily without wasted space between. The polygonal cross-sectional shape need only be present in the cell and the jacket however and the chimney and axially located cylinder within the cell can if desired retain the right cylindrical cross-sectional shape or any other convenient shape.

We claim:

1. A vapor/liquid separation device comprising a cylindrical cell with a vertical axis defined by an outer cell wall and having lower and upper portions and a chimney portion within the cylindrical cell wherein:

a) the lower portion has an outer base area with slots of a size to permit access of upflowing vapors when in use, surrounding an axially central cylinder of smaller cross-section that projects within the cell and is open at the lower end and closed at the upper end and communicates through radial slots adjacent the closed upper end with hollow radial vanes which are angled with respect to the vertical and extend from the axially central cylinder and through the wall of the cylindrical cell into a jacket zone surrounding the cylindrical cell at a point adjacent the lower end of said jacket zone, said jacket zone being defined by the cylindrical cell wall and an outer co-axial jacket wall;

b) the upper portion is open and terminates at a point lower than the outer wall of the outer co-axial jacket zone and the outer cell wall in this upper portion is provided with slots communicating with the jacket zone; and c) the chimney portion is coaxial with the cylindrical cell, has essentially the same length, has a diameter greater than the axially central cylinder and is provided with perforations adjacent the lower end of the chimney portion allowing communication between the interior of the central chimney portion and the outer base area of the cylindrical cell.

2. A vapor/liquid separation device according to claim 1 in which the hollow radial vanes have an aerofoil cross-section with a convex upper surface.

3. A vapor/liquid separation device according to claim 1 in which the hollow radial vanes are angled with respect to a radius of the cell defined by the cell axis and the end of the vane nearest the axis of the cell such that each vane passes through the cell wall at a point removed by an equal amount in the same direction from the intersection of the said radius with the cell wall.

4. A vapor/liquid separation device comprising at least two cells according to claim 1 located one above the other.

* * * * *